US 6,748,503 B1

(12) United States Patent
Morrison

(10) Patent No.: US 6,748,503 B1
(45) Date of Patent: Jun. 8, 2004

(54) SYSTEM AND METHOD FOR FACILITATING UNMANAGED CODE PARTICIPATION IN GARBAGE COLLECTION

(75) Inventor: Vance P. Morrison, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 240 days.

(21) Appl. No.: 09/894,241

(22) Filed: Jun. 27, 2001

(51) Int. Cl.[7] .............................................. G06F 12/08
(52) U.S. Cl. ........................ 711/159; 711/170; 707/206
(58) Field of Search ................................ 711/170, 159; 707/206

(56) References Cited

U.S. PATENT DOCUMENTS

| 5,560,003 A | * | 9/1996 | Nilsen et al. ................ 707/206 |
| 5,652,883 A | | 7/1997 | Adcock ....................... 395/622 |
| 5,842,016 A | | 11/1998 | Toutonghi et al. .......... 395/676 |
| 6,065,020 A | | 5/2000 | Dussud ....................... 707/206 |

OTHER PUBLICATIONS

Richard Jones and Rafael Lins, "Garbage Collection, Algorithms for Automatic Dynamic Memory Management", Copyright 1996; pp. 230–241.*
William E. Kempf, "A Garbage Collection Framework for C++", Copyright 2001. (www.codeproject.com).*
Richter, Jeffrey, "Garbage Collection: Automatic Memory Management in the Microsoft.NET Framework", msdn online magazine, http://msdn.microsoft.com/msdnmag/issues/1100/GCI/GCI.asp, Viewed on May 3, 2001, p. 1–12.

* cited by examiner

Primary Examiner—Mano Padmanabhan
Assistant Examiner—Midys Inoa
(74) Attorney, Agent, or Firm—Amin & Turocy, LLP

(57) ABSTRACT

A system and method for facilitating unmanaged code participation in a memory management system employing a garbage collection system or service is provided. The invention provides for an unmanaged component to invoke a machine state capturing component that captures machine state (e.g., machine registers and stack pointer) into a machine state data structure and publishes the fact that the unmanaged component desires to participate in garbage collection pointer enumeration. The invention further provides for an unwind component to be invoked during garbage collection that determines register value(s) to facilitate participation in garbage collection pointer enumeration by the unmanaged component. As part of its participation in garbage collection, the unwind component can alter contents of the machine state data structure stored by the machine state capturing component. The invention further provides for an unmanaged component to invoke a machine state restoring component that restores the machine state (e.g., machine registers and stack pointer) saved by the machine state capturing component, which may have been altered by garbage collection, and to publish the fact that the unmanaged component no longer desires to participate in garbage collection pointer enumeration.

21 Claims, 7 Drawing Sheets

SYSTEM AND METHOD FOR FACILITATING UNMANAGED CODE PARTICIPATION IN GARBAGE COLLECTION

TECHNICAL FIELD

The present invention relates generally to the management of memory in computer systems, and more particularly to a system and method facilitating code generated by an unmanaged compiler to participate in garbage collection.

BACKGROUND OF THE INVENTION

Memory available for program execution is one of the most important resources in a computer system. Therefore, much time and energy has been directed to efficient utilization and management of memory. An important aspect of memory management is the manner in which memory is allocated to program(s), deallocated and then reclaimed for use by other program(s). A memory manager dynamically manages a "heap" of memory from which it allocates blocks to program(s). When program(s) need a block of memory to store data, the program(s) send a request to the memory manager for memory. The memory manager then allocates a block of memory in the heap to satisfy the request and sends a reference (e.g., a pointer) to the block of memory to the program(s). The program(s) can then access the block of memory through the reference.

Conventionally, many programming languages have placed the responsibility for dynamic allocation and deallocation of memory on the programmer. These programming language types are referred to as unmanaged or unsafe programming languages, because pointers can be employed anywhere in an object or routine. In C, C++ and Pascal programming languages, memory is allocated from the heap by a call procedure, which passes a pointer to the allocated memory back to the call procedure. A call to free the memory is then available to deallocate the memory (e.g., return it to the heap). However, if a program overwrites a pointer, the corresponding heap segment becomes inaccessible to the program and the memory manager. Inaccessible heap segments are known as "memory leaks".

In many conventional programming languages, heap allocations are required for data structures that survive the procedure that created them. If these data structures are passed to further procedures or functions, it may be difficult or impossible for the programmer or compiler to determine the point at which it is safe to deallocate them. Memory, such as data structures, that are no longer reachable, but have not been freed are called garbage.

An alternative to requiring explicit memory deallocation calls is to place the responsibility for finding unused memory on a component of the runtime environment called the garbage collector. The garbage collector (GC) component has the responsibility for periodically traversing data structure(s) in program(s) to find memory that is still being accessed (directly and/or indirectly) and reclaiming memory that is no longer being used. Additionally, many garbage collectors are "compacting", that is, they move memory block(s) that are currently in use together (e.g., contiguous), removing "holes" left by unused memory (e.g., deallocated). Such garbage collectors require the ability to find pointer(s) to GC memory (e.g., to determine which location(s) are currently in use) and also the ability to update pointer(s) so that memory item(s) on the GC heap can be moved in order to compact the GC heap.

Accordingly, for a GC to occur, pointer(s) to memory managed by the garbage collector need to be enumerated, including pointer(s) that are in machine register(s) as well as pointer(s) stored on the execution stack. One way of providing this capability is for a compiler that generates the machine instruction(s) to also output extra information for garbage collection. Such code is called "managed code" because it enables management of garbage collector memory by the runtime environment. Conventional compilers that don't provide this extra information for garbage collection generate "unmanaged code". Unmanaged code generated by conventional compilers normally must be: (1) highly constrained (e.g., be short and never call a method that could possibly cause a GC); and, (2) wrapped by a relatively inefficient routine that saves machine state on entry and restores the state on exit. This routine can then participate in the unwinding protocol on the unmanaged code's behalf. This mechanism does not allow the unmanaged code to manipulate GC pointers since the wrapper method is not knowledgeable regarding manipulation(s) that can occur within the wrapped routine.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

At the time of garbage collection, garbage collectors enumerate and/or update a set of pointer(s) that point at the memory heap managed by the garbage collector. The set of pointer(s) includes pointer(s) stored in machine register(s) and/or pointer(s) stored on the execution stack. Since machine register(s) can be saved (e.g., spilled), and restored repeatedly, determining location(s) of pointer(s) (e.g., stored in machine register(s) and/or on the execution stack) is not trivial.

The present invention relates to a system and method allowing code generated by an unmanaged compiler to participate in garbage collection and, thus, mitigate limitation(s) of the prior art. To simplify garbage collection, machine register(s) that could possibly hold GC pointers are spilled to memory before a GC happens. A machine state data structure is defined which holds: (1) for every register that can hold a GC pointer, the address where it was spilled; and, (2) the value(s) for other relevant machine register(s) (e.g., instruction pointer and/or stack pointer). Method(s) are then required to provide at least the following functionality. First, given a machine state data structure that represents a machine state that existed when last executing within the method, enumerate the address(es) of GC pointer(s) in use for the method at that point in time. The address of the GC pointer(s) is passed so that the GC can update the pointer(s) if required. Second, given a machine state data structure that represents a machine state that existed when last executing within the method, compute the machine state structure that represents the machine state that will exist at the time execution resumes within the method. (e.g., unwind out of the method).

The first capability allows a method to report its own GC pointer(s). The second capability allows the GC to find the caller of the method so that the call stack can be enumerated. Note that the second capability is necessary even if the method does not have GC pointer(s) of its own to report.

Methods that support these two capabilities are called "managed methods". Usually managed methods require support from the compiler that created the method. The compiler outputs additional information about the method that indicates when and where GC pointers are stored while the method is executing.

An aspect of the present invention provides for an unmanaged component (e.g., generated by an unmanaged compiler) to invoke a machine state capturing component that captures the machine state (e.g., callee saved machine register value(s) and stack pointer) into a machine state data structure and publishes the fact that the unmanaged routine desires to participate in garbage collection pointer enumeration and unwinding protocol.

Another aspect of the present invention provides for an unwind component to be invoked during garbage collection that, if the unmanaged component has published the fact that it desires to participate in garbage collection pointer enumeration, utilizes information stored in the machine state data structure (e.g., unmanaged component saved machine register value(s) and stack pointer) to facilitate participation in garbage collection by the unmanaged routine. As part of its participation in garbage collection, the unwind component can alter contents of the machine state data structure stored by the capture state routine, memory heap pointer(s) and/or information stored on the stack.

Yet another aspect of the present invention provides for the unmanaged component to invoke a machine state restoring component that restores the machine state (e.g., machine register value(s) and stack pointer) saved by the machine state capturing component (which may have been altered by garbage collection) and/or register(s) affected by garbage collection (e.g., memory heap pointer(s)), and publishes the fact that the unmanaged component no longer desires to participate in garbage collection pointer enumeration.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
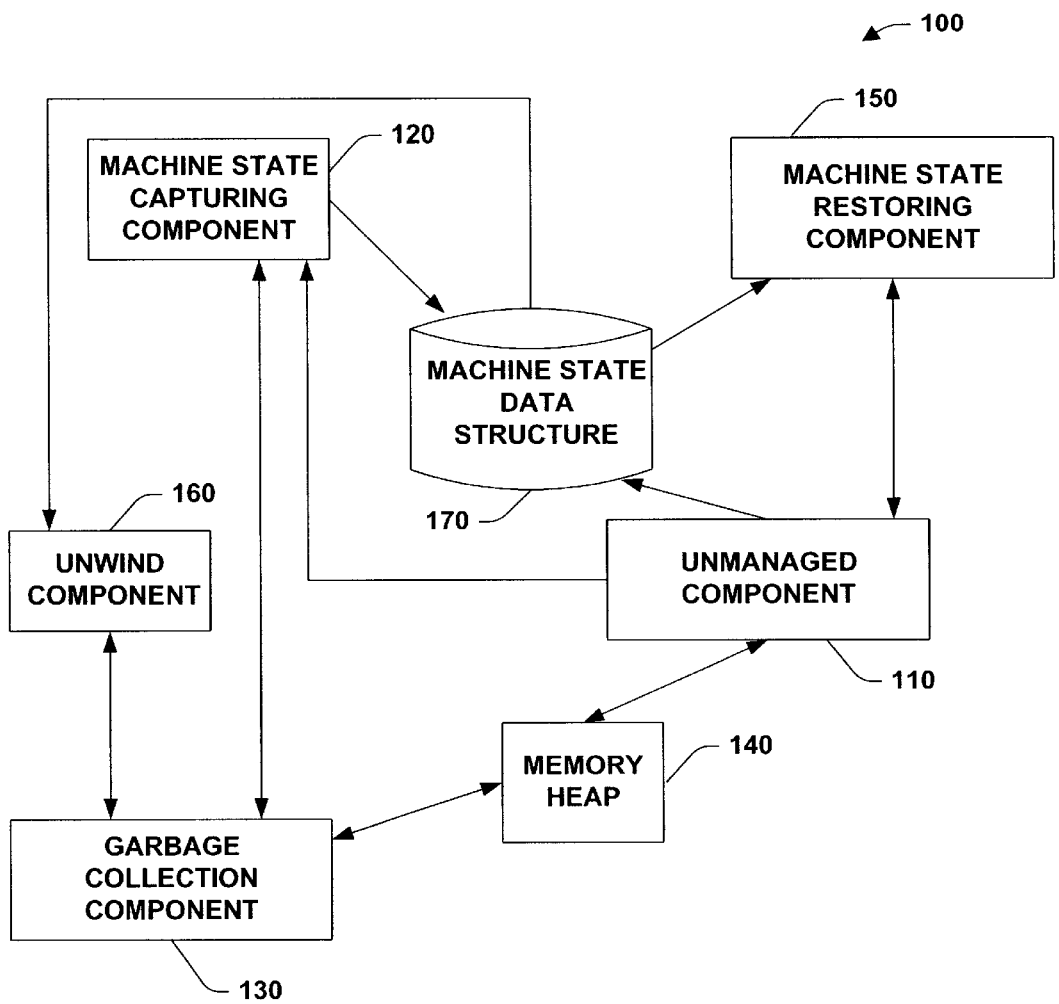
FIG. 1 is a shematic block diagram of a system facilitating participation in garbage collection by an unmanaged component in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Referring to FIG. 1, a system 100 for facilitating participation in garbage collection by an unmanaged component is illustrated. The system 100 includes an unmanaged component 110, a machine state capturing component 120, a garbage collection component 130, a memory heap 140, a machine state restoring component 150, an unwind component 160 and a machine state data structure 170. The unmanaged component 110 can be a program (e.g., module of machine instruction(s)) compiled by a unmanaged compiler (e.g., one that does not support garbage collection, for example, a conventional C++ compiler), but desires to participate in garbage collection (e.g., it wishes to perform operation(s) that might cause a garbage collection)

During execution of the unmanaged component 110, the unmanaged component 110 may need to perform operation (s) that can cause garbage collection to occur. The need to perform operation(s) that can cause garbage collection can be conditional. Path(s) through the unmanaged component 110 that are short and cannot cause a garbage collection can be left unmodified. Pseudo-code for establishing and destroying an environment in which a garage collection can occur is:

```
allocate machine state data structure;
do {
    if(machine state capturing component (&machine state data
    structure) <> 0 then
        return;
    else
        /* arbitrary work that can cause a garbage collection*/
} while (machine state restoring component <> 0)
```

The unmanaged component 110 allocates the machine state data structure 170 and invokes the machine state capturing component 120 passing a pointer to the machine state data structure 170. The machine state capturing component 120 is responsible for storing the current value(s) of the machine register(s) for use by the unwind component 160. The machine state capturing component 120 further publishes the fact that the unmanaged component 110 desires to participate in garbage collection pointer enumeration.

Significantly, the captured machine state stored in the machine state data structure 170 is not the machine state that is needed to unwind from the unmanaged component 110 (e.g., some of the original machine register(s) may have been saved by the unmanaged compiler on entry to the unmanaged component 110, and can be in use for other purposes). Thus, a mechanism is needed to recover the machine state that will exist when the unmanaged component 110 returns from the state captured by the machine state capturing component 120. This is the purpose of the "then—return" branch in the in the pseudo-code above.

The return statement is not intended to be executed at run time (e.g., the machine state capturing component always returns zero). The purpose of the "then" branch is to force the unmanaged compiler used to compile the unmanaged component 110 to generate native machine instruction(s) for restoring the machine register(s) prior to returning to the invoking routine. This instruction sequence will be used by the unwind component 160, if a garbage collection happens to map the captured machine state, into the machine state that will exist when the unmanaged component 110 returns.

The garbage collection component 130 is responsible for performing garbage collection for the memory heap 140. It can be invoked either in response to operations in the unmanaged component 110 and/or asynchronously by other threads requesting a garbage collection. During the collection the garbage collection component 130 enumerates the stack, starting with the top method (e.g., program). Eventually it gets to the unmanaged component 110 and discovers the published information. By default the published information indicates that there are no GC pointers to report for the unmanaged component 110 itself (although it is within the scope of the present invention to have an API that allows the unmanaged component 110 to request that certain GC pointer(s) be reported). When the GC requests an unwind out of the unmanaged component 110, it is directed to the unwind component 160.

The unwind component 160 maps the captured machine register(s) stored in the machine state data structure 170 back to the machine state that will exist when the unmanaged component 110 returns by examining the instructions generated by the "return" statement. For example, X86 machine instructions (e.g., generated by the unmanaged compiler) for the "then" branch could include:

Test EAX, EAX
JZ Epilog
. . .
Epilog:
   XOR EAX, EAX
   POP ESI
   POP EDI
   MOV ESP, EBP
   POP EBP
   RET 4

In this example, the unwind component 160 can determine that the unmanaged component 110 saved machine registers ESI and EDI at the top two stack locations pointed to by the ESP register in the captured machine state. The unwind component 160 can further determine that the unmanaged component 110 saved register EBP at the location pointed to by the EBP register in the captured machine state. Finally, the unwind component 160 can determine that the unmanaged component 110 saved register EBX was not altered (e.g., spilled) and thus should be the value in the captured machine state. Having this information, the unwind component 160 can perform the unwind operation(s) required by the garbage collection component 130. In this example, the unwind component 160 can report that register ESI is saved at the location pointed to by the captured stack pointer, register EDI is saved at the location just above ESI, register EBP is saved at the location pointed to by the captured EBP value, and, register EBX is saved at the location in the machine state data structure 170 stored by the machine state capturing component 120. Further, the unwind component 160 can report that the return from which the unmanaged component 110 was invoked is above the EBP value, and, the value of the stack pointer when the unmanaged component 110 returns will be four bytes above that location.

Equipped with information from the unwind component 160, the garbage collection component 130 can perform garbage collection (e.g., via garbage collection pointer enumeration). Significantly during garbage collection, the garbage collection component 130 can alter garbage collection pointer(s) some of which may be stored in machine register(s). These updates happen to the location(s) reported by the unwind component 160. Thus, in the example above, the values on the stack for EDI and ESI might be updated, as well as the location in the machine state data structure 170 holding the captured value of EBX.

The unmanaged component 110 can indicate its desire to no longer participate in garbage collection by invoking the machine state restoring component 150 passing a reference (e.g., pointer) to the machine state data structure 170. The machine state restoring component 150 is responsible for updating the register(s) value(s) saved from the machine state capturing component 120 if the register(s) value(s) were not saved (e.g., spilled) by the unmanaged component 110. In the example above, EBX needs to be restored but ESI and EDI do not need to be restored. The machine state restoring component 150 further publishes the fact that the unmanaged component 110 no longer desires to participate in garbage collection pointer enumeration.

Significantly, it is possible for register(s) to be saved at many points in the unmanaged code. However the unmanaged code must restore all saved register(s) through any path through the unmanaged code. In particular it is possible that additional register(s) are saved between the time the machine state capturing component 120 was called and the time the machine date restoring component 150 was called. This scenario could lead to the machine state restoring component 150 updating a register that is presently in use by the unmanaged component 110 and will be restored to a value saved by the unmanaged component 110. Thus, any change made by the machine state restoring component 150 would be lost. Cleary this scenario must be prevented. This is the function of the 'do-while' loop in the pseudo code above. This loop is never actually gets executed (e.g., the machine state restoring component 150 always returns 0); however, the unmanaged compiler can't determine this fact. Thus, the compiler is required to ensure that a code path that includes the loop saves and restores the same register(s) as a path that does not loop. For all reasonable compilers (that try to minimize instruction inside loops) this ensures that any spills that happen will happen outside the loop, and thus avoid the problematic scenario.

It is to be appreciated that the Intel X86 machine instructions have been utilized for the purpose of illustration and not for limiting of the present invention. Those skilled in the art will recognize that the present invention is not limited to use with the X86 machine architecture but also can be employed with other machine architectures.

Figure 2:
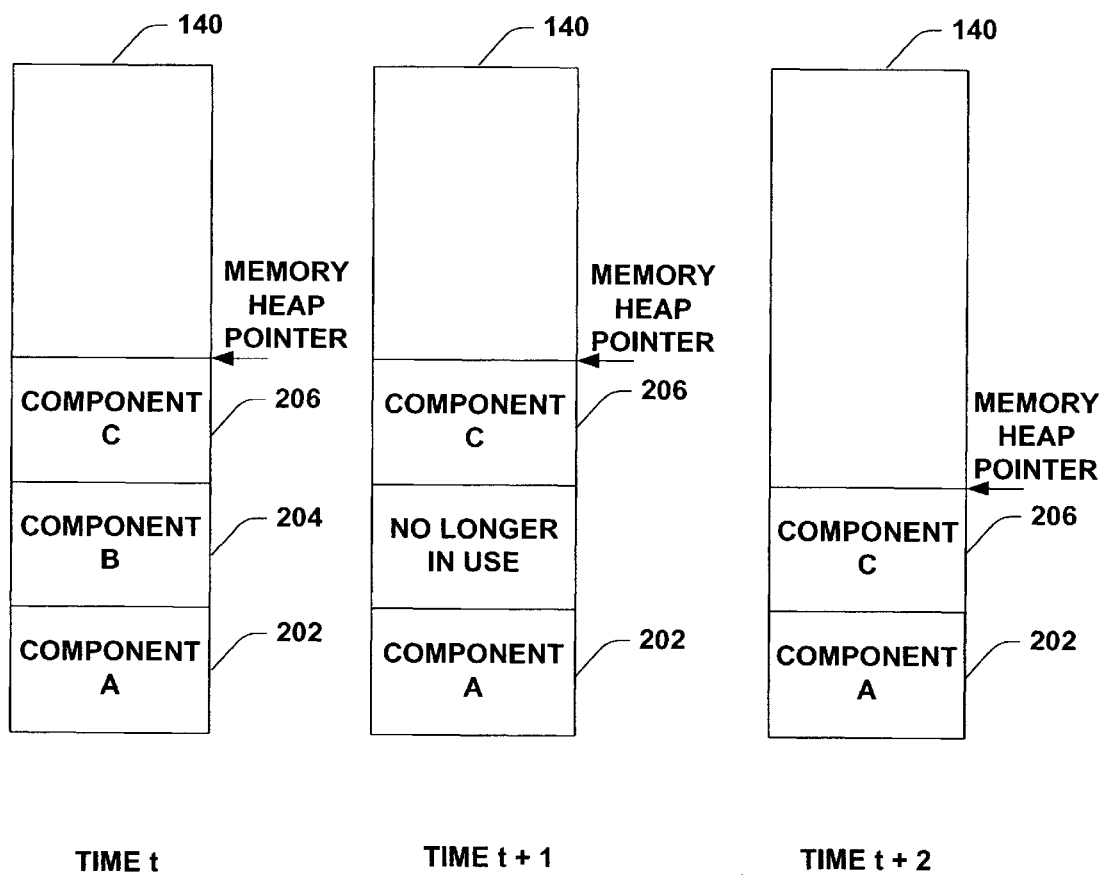
FIG. 2 is a exemplary memory heap with garbage collection employed in accordance with as aspect of the present invention.

FIG. 2 illustrates an exemplary memory heap 140 with garbage collection employed in accordance with as aspect of the present invention. FIG. 2 depicts the memory heap 140 at time t, t+1 and t+2. At time t, the memory heap 140 has areas of memory associated with three objects: object A 202, object B 204 and object C 206. At time t+1, the area of memory associated with object B 204 is no longer in use (e.g., program associated with object B has completed its use of this area of memory). At time t+2, garbage collection has been performed and the area of memory associated with object B 204 at time t has been reallocated.

In view of the exemplary systems shown and described above, methodologies that may be implemented in accordance with the present invention will be better appreciated with reference to the flow charts of FIGS. 3, 4, 5 and 6. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 3:
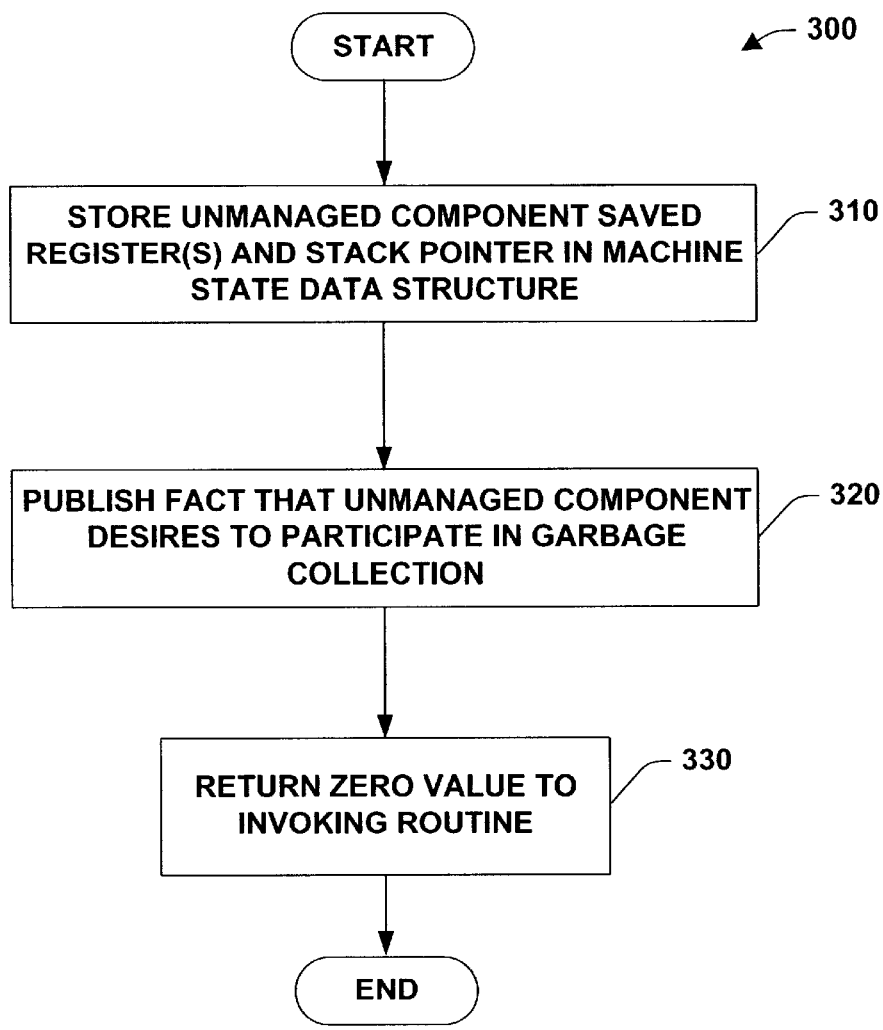
FIG. 3 is a flow chart illustrating a methodology for capturing machine state in accordance with an aspect of the present invention.

Turning to FIG. 3, a methodology 300 for capturing machine state in accordance with an aspect of the present invention is illustrated. At 310, unmanaged component saved register(s) and the stack pointer are stored in a machine state data structure. Next, at 320, the fact that the unmanaged component desires to participate in garbage collection is published (e.g., to the memory manager and/or garbage collection component). Next, at 330, a zero value is returned to the invoking routine. It is to be appreciated that a zero value has been utilized for the purpose of illustration and not for limiting of the present invention. Those skilled in the art will recognize that the present invention is not limited to this convention but also can be employed with other coordination schema between the invoking routine and the machine state capturing component.

Figure 4:
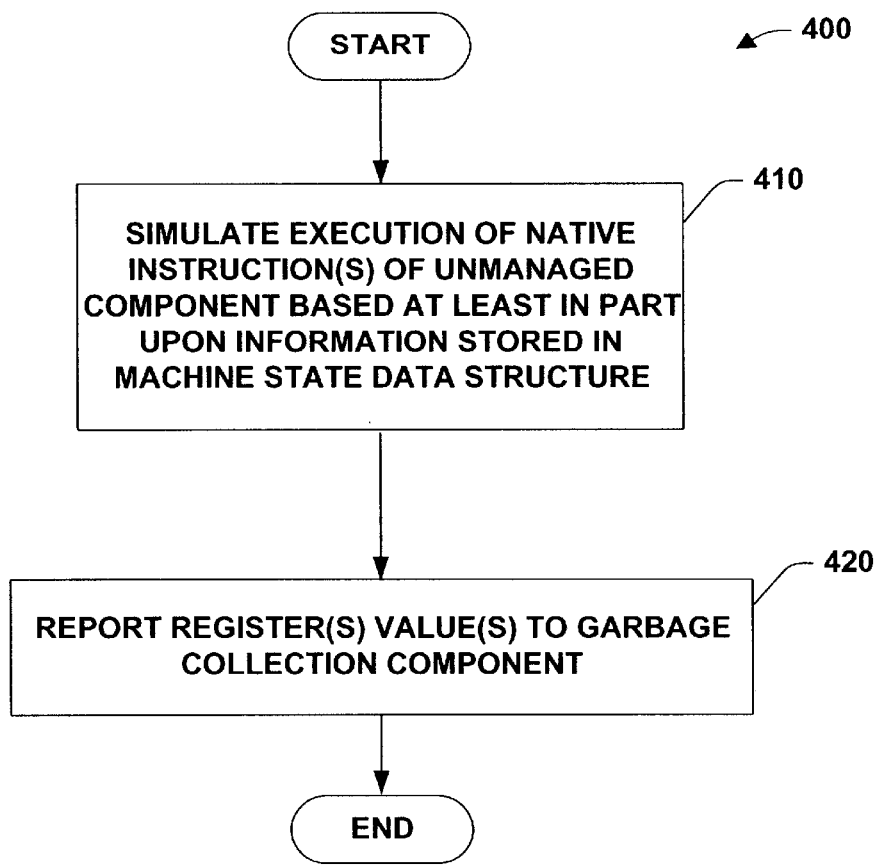
FIG. 4 is a flow chart illustrating a methodology for unwinding information stored in a machine state data structure in accordance with an aspect of the present invention.

Next, referring to FIG. 4, a methodology 400 for unwinding information stored in a machine state data structure in accordance with an aspect of the present invention is illustrated. At 410, based at least in part upon information stored in a machine state data structure, native instruction(s) of an unmanaged component are simulated in order to facilitate garbage collection by determining location(s) and/or value(s) of machine register(s) saved by the unmanaged component. At 420, the register(s) value(s) are reported to a garbage collection component.

Figure 5:
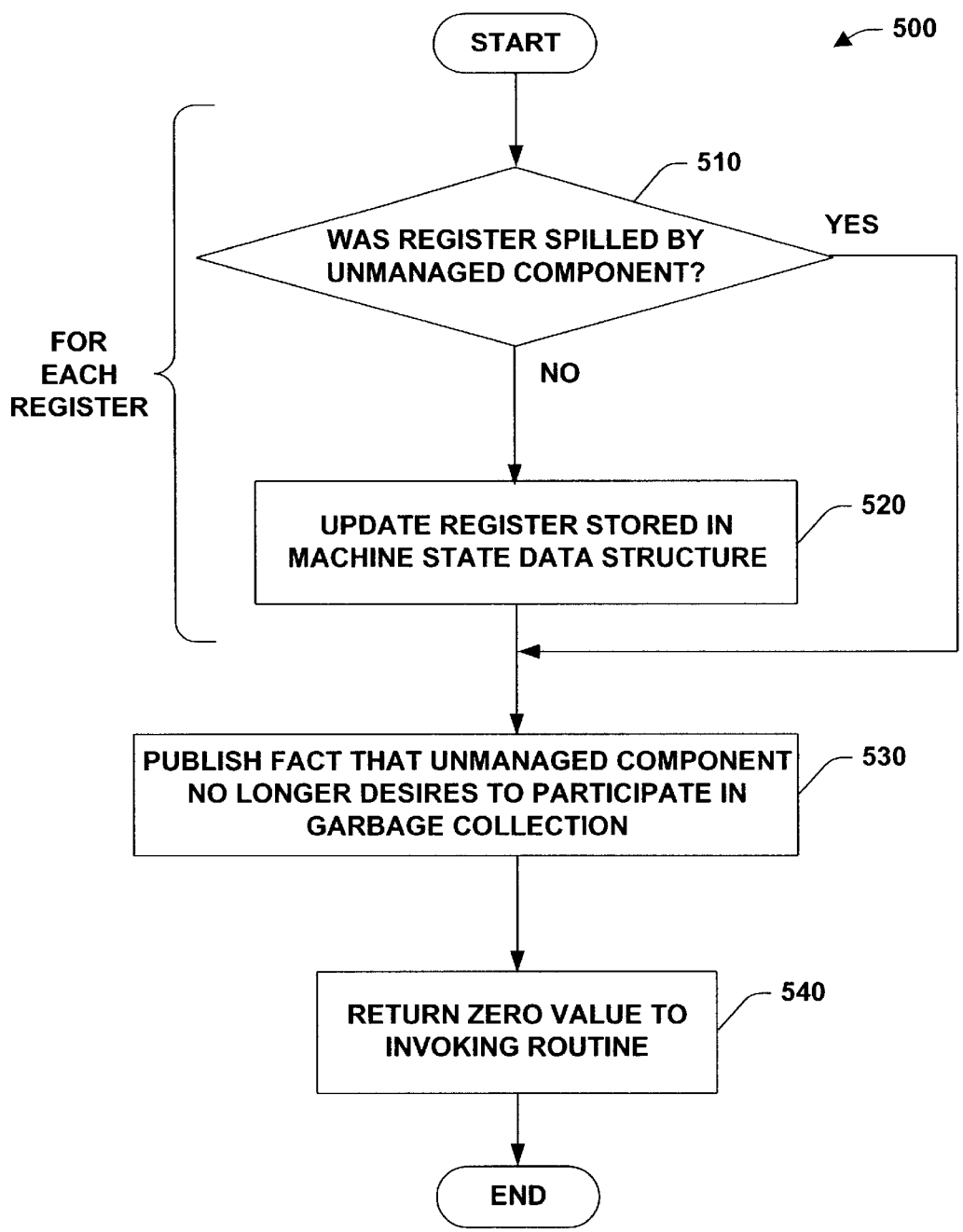
FIG. 5 is a flow chart illustrating a methodology for restoring machine state in accordance with an aspect of the present invention.

Turning to FIG. 5, a methodology 500 for restoring machine state in accordance with an aspect of the present invention is illustrated. For each machine register, at 520, a determination is made whether the register was spilled by an unmanaged component. If the determination at 510 is YES, processing continues at 510 for any remaining machine registers. If the determination at 510 is NO, at 520, a value stored in a machine state data structure is loaded into the register. Thereafter, at 530, the fact that the unmanaged component no longer desires to participate in garbage collection is published (e.g., to the memory manager and/or garbage collection component). Next, at 540, a zero value is returned to the invoking routine. It is to be appreciated that a zero value has been utilized for the purpose of illustration and not for limiting of the present invention. Those skilled in the art will recognize that the present invention is not limited to this convention but also can be employed with other coordination schema between the invoking routine and the machine state restoring component.

Figure 6:
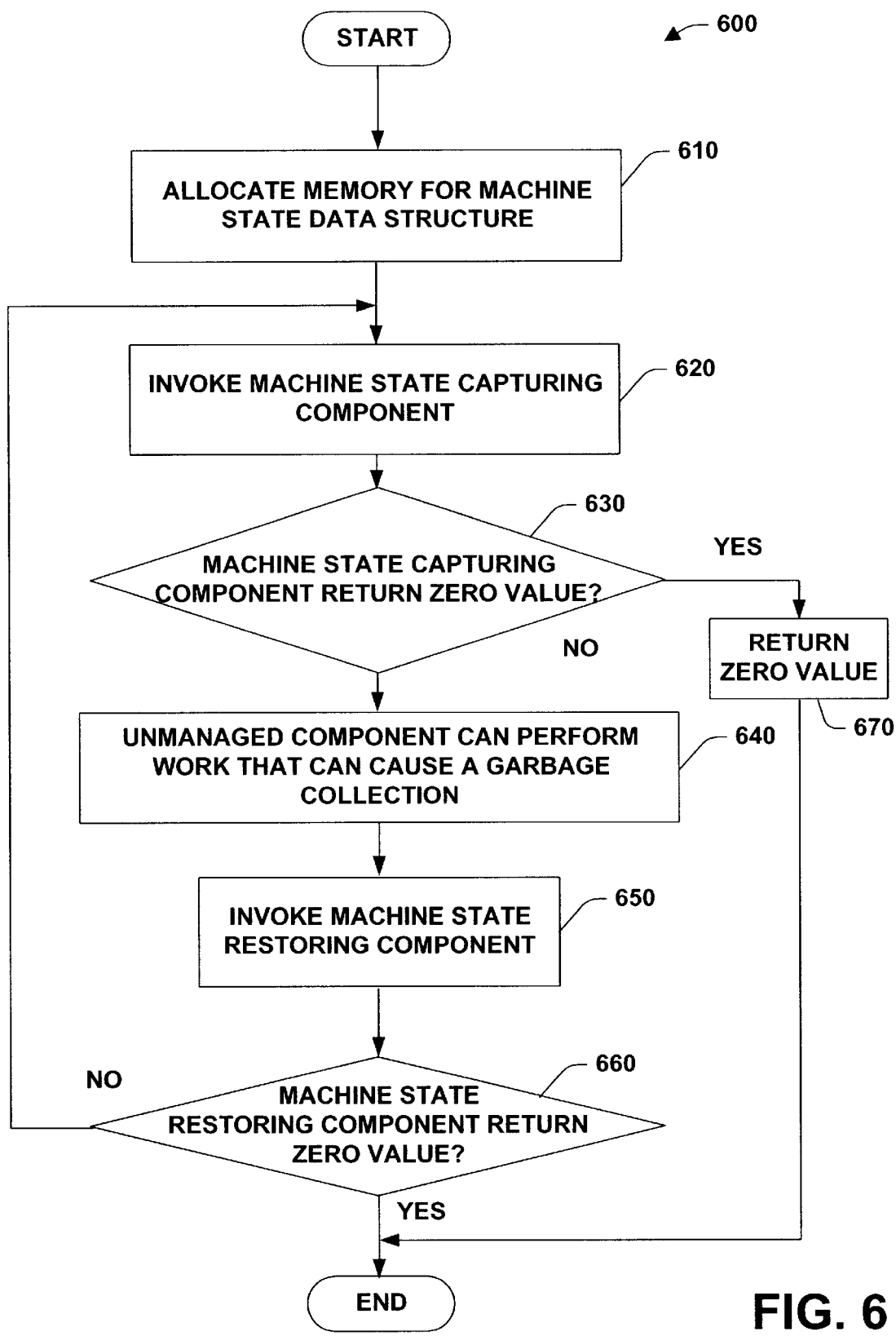
FIG. 6 is a flow chart illustrating a methodology for facilitating an unmanaged component to participate in garbage collection in accordance with an aspect of the present invention.

Next, referring to FIG. 6, a methodology 600 facilitating an unmanaged component to participate in garbage collection in accordance with an aspect of the present invention is illustrated. At 610, memory is allocated for a machine state data structure. Next, at 620, a machine state capturing component is invoked. At 630, a determination is made whether the machine state capturing component returned a zero value. If the determination at 630 is YES, a zero value is returned by the unmanaged component to the routine which invoked it. The YES branch of the decisional at 630 is generally not meant to be executed at run time; it is included to force an unmanaged compiler to provide machine instruction(s) related to information (e.g., register (s)) stored by the unmanaged component when it was invoked. If the determination at 630 is NO, at 640 the unmanaged component can perform work which can cause a garbage collection. Next at 650, a machine state restoring component is invoked. Next, at 660, a determination is made whether the machine state restoring component returned a zero value. If the determination at 660 is NO, processing continues at 620. The NO branch of the decision at 660 is generally not meant to be executed at run time; it is included to prevent an unmanaged compiler from spilling any additional unmanaged component saved register(s) between the invocation of the machine state capturing component and the machine state restoring component. If the determination at 660 is YES, no further processing occurs.

Figure 7:
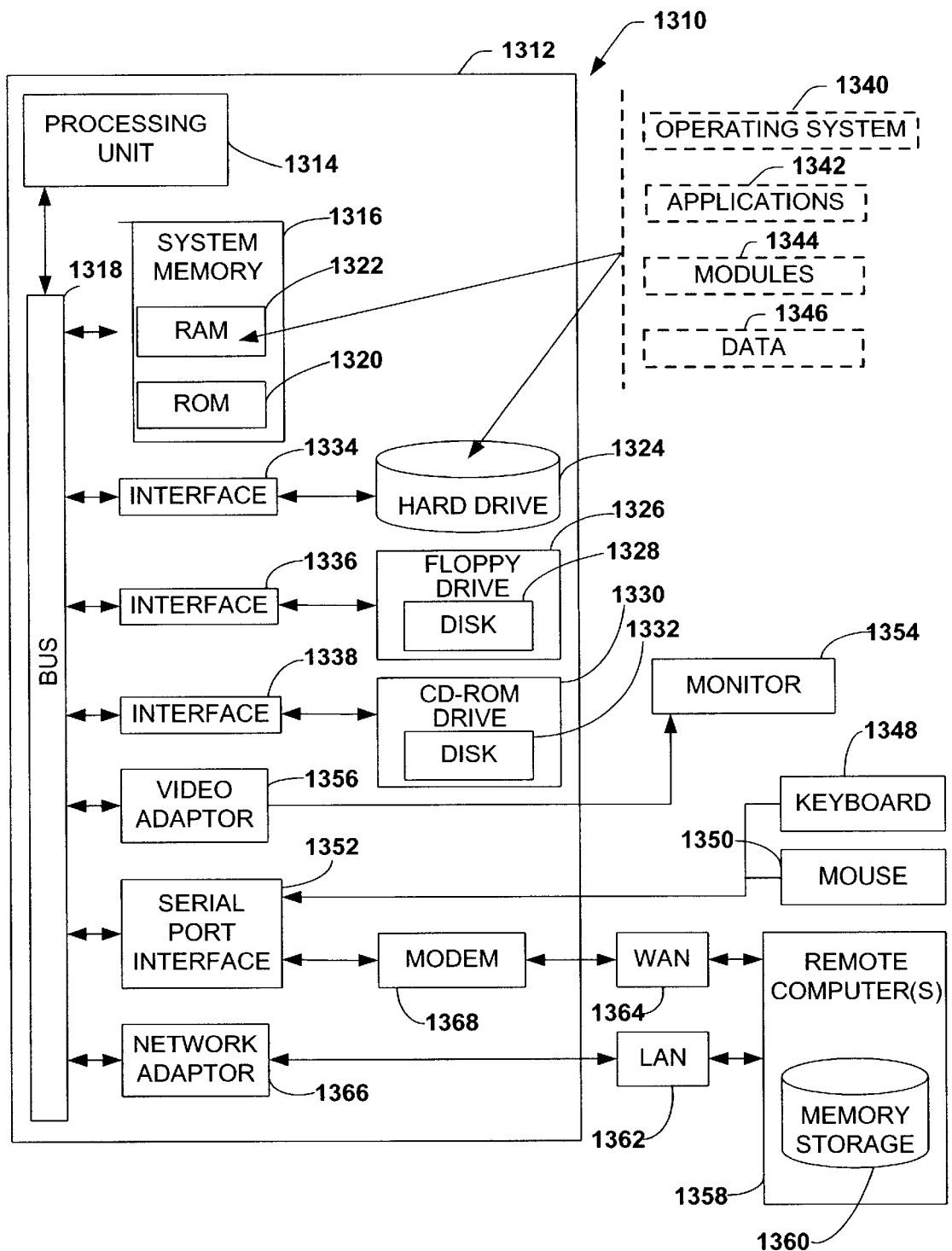
FIG. 7 is a schematic block diagram of an exemplary operating environment for a system configured in accordance with the present invention.

In order to provide additional context for various aspects of the present invention, FIG. 7 and the following discussion are intended to provide a brief, general description of one possible suitable computing environment 1310 in which the various aspects of the present invention may be implemented. It is to be appreciated that the computing environment 1310 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 7 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 7, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

The present invention has been described with respect to facilitating garbage collection. However, those skilled in the art will recognize that the system and methods of the present invention can be utilized to facilitate exception handling and/or program debugging.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating memory management, comprising:
   storing a machine state associated with an unmanaged component;
   performing garbage collection, the unmanaged component participating in the garbage collection; and
   restoring the machine state based at least in part upon garbage collection;
   the act of storing a machine state associated with unmanaged component further comprising the following:
   storing a register saved by the unmanaged component into a machine state data structure;
   storing a stack pointer into the machine state data structure; and,
   publishing the unmanaged component's desire to participate in garbage collection.

2. The method of claim 1, the act of performing garbage collection further comprising at least one of the following:
   simulating execution of a native instruction of the unmanaged component based at least in part upon information stored in the machine state data structure; and,
   reporting a register value to a garbage collection component.

3. The method of claim 1, the act of restoring the machine state further comprising at least one of the following:
   updating a register based at least in part upon garbage collection, if the register was not affected by the unmanaged component; and,
   publishing the unmanaged component's desire not to further participate in garbage collection.

4. A method for facilitating memory management, comprising:
   storing an unmanaged component saved register into a machine state data structure;
   storing a stack pointer into the machine state data structure; and,
   publishing the unmanaged component's desire to participate in garbage collection.

5. A method for facilitating memory management, comprising:
   simulating execution of a native instruction of an unmanaged component based at least in part upon information stored in a machine state data structure; and,
   reporting a register value to a garbage collection component.

6. A method for facilitating memory management, comprising:
   updating a register based at least in part upon garbage collection, if the register was not affected by an unmanaged component; and,
   publishing the unmanaged component's desire not to further participate in garbage collection.

7. A system that facilitates memory management, comprising:
   a machine state capturing component storing a machine state associated with an unmanaged component to facilitate garbage collection of a memory heap;
   a garbage collection component performing garbage collection of the memory heap including the unmanaged component;
   an unwind component facilitating garbage collection including the unmanaged component; and
   a machine state restoring component restoring the machine state based at least in part upon garbage collection of the memory heap.

8. The system of claim 7, the machine state capturing component further storing at least one of a register value saved by the unmanaged component and a stack pointer in the machine state data structure.

9. The system of claim 7, the unwind component further simulating execution of a native instruction of the unmanaged component based at least in part upon information stored in the machine state data structure.

10. The system of claim 7, the machine state restoring component further updating a register based at least in part upon information stored in the machine state data structure if the register was not spilled by the unmanaged component.

11. A system that facilitates memory management, comprising:
    means for capturing a machine state associated with an unmanaged component and storing the machine state in a machine state data structure to facilitate garbage collection;
    means for performing garbage collection of the memory heap including the unmanaged component;
    means for unwinding information stored in the machine state data structure facilitating garbage collection including the unmanaged component; and
    means for restoring a machine state associated with an unmanaged component based at least in part upon garbage collection of the memory heap.

12. The system of claim 11, further comprising:
    means for simulating execution of a native instruction of the unmanaged component to facilitate garbage collection.

13. A system that facilitates computer program development, comprising:
    means for capturing a machine state associated with an unmanaged component and storing the machine state in a machine state data structure to facilitate at least one of debugging and exception handling; and,
    means for unwinding information stored in the machine state data structure facilitating at least one of debugging and exception handling including the unmanaged component.

14. A system that facilitates memory management, comprising:
    a machine state capturing component that stores a machine state associated with an unmanaged component to facilitate garbage collection of a memory heap;
    a garbage collection component that performs garbage collection of the memory heap including the unmanaged component;
    an unwind component that determines locations and values of machine registers saved by the unmanaged component to facilitate garbage collection; and
    a machine state restoring component that restores the machine state based at least in part upon garbage collection of the memory heap.

15. The system of claim 14, wherein the machine state comprises at least one of a register value saved by the unmanaged component and a stack pointer in the machine state data structure.

16. The system of claim 14, wherein the unwind component simulates execution of a native instruction of the unmanaged component based at least in part upon information stored in the machine state data structure.

17. The system of claim 14, wherein the machine state restoring component updates a register based at least in part upon information stored in the machine state data structure if the register was not spilled by the unmanaged component.

18. A system that facilitates memory management, comprising:

an unmanaged component that performs an operation that initiates garbage collection;

a machine state capturing component that stores a current machine state;

a garbage collection component that performs garbage collection of a memory heap if the unmanaged component performs the operation;

an unwind component that alters the machine state in response to instructions from the unmanaged component; and a machine state restoring component that restores the machine state based at least in part upon the altered machine state.

19. The system of claim 18, wherein the current machine state comprises at least one of a register value saved by the unmanaged component and a stack pointer in the machine state data structure.

20. The system of claim 18, wherein the unmanaged component invokes the machine state restoring component to indicate its desire to no longer participate in garbage collection.

21. The system of claim 18, wherein the machine state restoring component updates a register based at least in part upon information stored in the machine state data structure if the register was not spilled by the unmanaged component.

* * * * *